United States Patent
Zhu et al.

(10) Patent No.: US 10,530,558 B2
(45) Date of Patent: Jan. 7, 2020

(54) INTRA-QCI SCHEDULER AND METHOD FOR INTRA-QCI SCHEDULING IN A WIRELESS ACCESS NETWORK

(71) Applicant: Intel Corporation, Santa Clara, CA (US)

(72) Inventors: Jing Zhu, Portland, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 15/164,085

(22) Filed: May 25, 2016

(65) Prior Publication Data

US 2016/0270104 A1    Sep. 15, 2016

Related U.S. Application Data

(63) Continuation of application No. 13/600,675, filed on Aug. 31, 2012.
(Continued)

(51) Int. Cl.
*H04L 5/14* (2006.01)
*H04W 76/28* (2018.01)
(Continued)

(52) U.S. Cl.
CPC .......... *H04L 5/1446* (2013.01); *H04L 1/0033* (2013.01); *H04L 1/1635* (2013.01);
(Continued)

(58) Field of Classification Search
CPC . H04L 1/1854; H04L 1/1887; H04L 41/5022; H04L 43/16; H04L 47/10;
(Continued)

(56) References Cited

U.S. PATENT DOCUMENTS

2010/0103845 A1    4/2010   Ulupinar et al.
2010/0026582 A1   10/2010   Zhao et al.
(Continued)

FOREIGN PATENT DOCUMENTS

AU    2013232628 B2    9/2013
CN    101932038 A    12/2010
(Continued)

OTHER PUBLICATIONS

"U.S. Appl. No. 13/600,675, Decision on Pre-Appeal Brief Request mailed Feb. 16, 2016", 2 pgs.
(Continued)

*Primary Examiner* — Kyaw Z Soe
(74) *Attorney, Agent, or Firm* — ,Schwegman Lundberg & Woessner, P.A.

(57) ABSTRACT

Embodiments of an intra-QCI scheduler and method for assisted intra-QCI scheduling are generally described herein for operating within a wireless access network in which data flows are mapped to bearers using quality-of-service (QoS) class identifiers (QCIs). In some embodiments, the intra-QCI scheduler may classify packets of one or more data flows having a same QCI with a sub-QCI based on intra-QCI classification information received from user equipment (UE). The sub-QCI may indicate a scheduling priority for packets of data flows having the same QCI. The intra-QCI scheduler may schedule packets for downlink transmission over a radio bearer between the eNodeB and the UE based on the sub-QCI. The use of sub-QCIs allows the eNodeB to provide QoS support for data flows of applications that have been mapped to a default bearer.

21 Claims, 3 Drawing Sheets

Related U.S. Application Data

(60) Provisional application No. 61/612,188, filed on Mar. 16, 2012.

(51) Int. Cl.

| | |
|---|---|
| *H04W 74/08* | (2009.01) |
| *H04W 72/12* | (2009.01) |
| *H04L 1/18* | (2006.01) |
| *H04L 1/16* | (2006.01) |
| *H04W 72/04* | (2009.01) |
| *H04L 12/865* | (2013.01) |
| *H04W 24/02* | (2009.01) |
| *H04N 21/414* | (2011.01) |
| *H04N 21/6408* | (2011.01) |
| *H04W 4/06* | (2009.01) |
| *H04L 5/00* | (2006.01) |
| *H04L 12/18* | (2006.01) |
| *H04L 29/06* | (2006.01) |
| *H04N 21/258* | (2011.01) |
| *H04N 21/6405* | (2011.01) |
| *H04W 24/00* | (2009.01) |
| *H04W 28/02* | (2009.01) |
| *H04W 52/02* | (2009.01) |
| *H04W 72/08* | (2009.01) |
| *H04L 1/00* | (2006.01) |
| *H04L 12/28* | (2006.01) |
| *H04W 52/24* | (2009.01) |
| *H04L 29/08* | (2006.01) |
| *H04W 76/27* | (2018.01) |
| *H04L 12/841* | (2013.01) |
| *H04W 52/14* | (2009.01) |
| *H04J 11/00* | (2006.01) |

(52) U.S. Cl.
CPC ............ *H04L 1/189* (2013.01); *H04L 1/1812* (2013.01); *H04L 1/1825* (2013.01); *H04L 1/1854* (2013.01); *H04L 1/1864* (2013.01); *H04L 1/1877* (2013.01); *H04L 1/1887* (2013.01); *H04L 1/1896* (2013.01); *H04L 5/001* (2013.01); *H04L 5/0053* (2013.01); *H04L 5/0055* (2013.01); *H04L 5/0073* (2013.01); *H04L 5/14* (2013.01); *H04L 5/1438* (2013.01); *H04L 5/1469* (2013.01); *H04L 12/189* (2013.01); *H04L 12/2854* (2013.01); *H04L 47/283* (2013.01); *H04L 47/6275* (2013.01); *H04L 65/601* (2013.01); *H04L 67/02* (2013.01); *H04L 67/2842* (2013.01); *H04N 21/25841* (2013.01); *H04N 21/41407* (2013.01); *H04N 21/6405* (2013.01); *H04N 21/6408* (2013.01); *H04W 4/06* (2013.01); *H04W 24/00* (2013.01); *H04W 24/02* (2013.01); *H04W 28/0236* (2013.01); *H04W 28/0268* (2013.01); *H04W 28/0278* (2013.01); *H04W 52/02* (2013.01); *H04W 52/0206* (2013.01); *H04W 52/0209* (2013.01); *H04W 52/0235* (2013.01); *H04W 52/243* (2013.01); *H04W 72/04* (2013.01); *H04W 72/042* (2013.01); *H04W 72/0406* (2013.01); *H04W 72/048* (2013.01); *H04W 72/0413* (2013.01); *H04W 72/0426* (2013.01); *H04W 72/082* (2013.01); *H04W 72/1205* (2013.01); *H04W 72/1242* (2013.01); *H04W 72/1273* (2013.01); *H04W 72/1284* (2013.01); *H04W 74/085* (2013.01); *H04W 76/27* (2018.02); *H04W 76/28* (2018.02); *H04J 11/0073* (2013.01); *H04L 1/1819* (2013.01); *H04W 52/0229* (2013.01); *H04W 52/143* (2013.01); *H04W 72/0446* (2013.01); *H04W 72/1268* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/22* (2018.01); *Y02D 70/23* (2018.01); *Y02D 70/24* (2018.01)

(58) Field of Classification Search
CPC ... H04L 47/122; H04L 47/24; H04L 47/2441; H04L 65/80; H04W 28/0268; H04W 28/0284; H04W 48/06; H04W 72/0413; H04W 72/042; H04W 72/12; H04W 72/1242; H04W 72/1284
See application file for complete search history.

(56) References Cited

U.S. PATENT DOCUMENTS

| | | | |
|---|---|---|---|
| 2010/0265823 A1 | 10/2010 | Zhao et al. | |
| 2011/0044198 A1 | 2/2011 | Persson et al. | |
| 2011/0194507 A1 | 8/2011 | Park | |
| 2011/0199900 A1* | 8/2011 | Ludwig | H04L 41/0893 370/230.1 |
| 2011/0305240 A1* | 12/2011 | Chu | H04L 47/10 370/391 |
| 2012/0008499 A1 | 1/2012 | Stanwood et al. | |
| 2012/0140633 A1* | 6/2012 | Stanwood | H04L 47/2458 370/235 |
| 2012/0176997 A1* | 7/2012 | Rydnell | H04W 76/022 370/329 |
| 2012/0218892 A1 | 8/2012 | Kotecha et al. | |
| 2012/0243462 A1 | 9/2012 | Bucknell et al. | |
| 2012/0250601 A1 | 10/2012 | Choi et al. | |
| 2012/0263119 A1 | 10/2012 | Monogioudis | |
| 2012/0275391 A1 | 11/2012 | Cui et al. | |
| 2012/0300615 A1 | 11/2012 | Kempf et al. | |
| 2013/0170350 A1* | 7/2013 | Sarkar | H04W 28/24 370/235 |
| 2013/0194919 A1 | 8/2013 | Garavaglia et al. | |
| 2013/0242887 A1 | 9/2013 | Zhu et al. | |
| 2014/0204950 A1 | 7/2014 | Willars et al. | |
| 2014/0317300 A1 | 10/2014 | Ludwig et al. | |
| 2015/0109910 A1* | 4/2015 | Hurd | H04W 28/0242 370/230 |

FOREIGN PATENT DOCUMENTS

| | | |
|---|---|---|
| CN | 101998296 A | 3/2011 |
| CN | 102355692 A | 2/2012 |
| EP | 2826291 B1 | 11/2016 |
| JP | 6141477 B2 | 5/2017 |
| KR | 101710847 B1 | 2/2017 |
| MX | 355521 B | 4/2018 |
| RU | 2600451 C2 | 10/2016 |
| RU | 2645303 C1 | 2/2018 |
| WO | WO-2013123467 A1 | 8/2013 |
| WO | WO-2014184347 A1 | 11/2014 |

OTHER PUBLICATIONS

"U.S. Appl. No. 13/600,675, Pre-Appeal Brief Request filed Jan. 8, 2016", 5 pgs.

"Australian Application Serial No. 2016204107, First Examination Report Received dated May 19, 2017", 9 pgs.

"Canadian Application Serial No. 2,867,017, Office Action dated Nov. 14, 2016", 3 pgs.

"Canadian Application Serial No. 2,867,017, Response filed May 5, 2017 to Office Action dated Nov. 14, 2016", 2 pgs.

(56) References Cited

OTHER PUBLICATIONS

"Canadian Application Serial No. 2,867,017, Response filed Jun. 9, 2016 to Office Action dated Dec. 10, 2015", 26 pgs.
"Chinese Application Serial No. 201380018734.6, Office Action dated Jul. 21, 2017", w/English Translation, 9 pgs.
"European Application Serial No. 16197269.0, Extended European Search Report dated Jan. 23, 2017", 7 pgs.
"Japanese Application Serial No. 2016-052223, Office Action dated Dec. 6, 2016", W/ English Translation, 29 pgs.
"Japanese Application Serial No. 2016-052223, Response filed Mar. 6, 2017 to Office Action dated Dec. 6, 2016", w/ English Claims, 15 pgs.
"Korean Application Serial No. 2016-7007375, Reason for Rejection dated Jun. 7, 2016", English Translation, 5 pgs.
"Korean Application Serial No. 2016-7007375, Response filed Aug. 5, 2016 to Reason for Rejection dated Jun. 7, 2016", W/English Claims, 13 pgs.
"Mexican Application Serial No. MX/a/2014/011092, Office Action dated Nov. 11, 2016", w/o English Translation, 6 pgs.
"Mexican Application Serial No. MX/a/2014/011092, Response filed Mar. 23, 2017 to Office Action dated Nov. 11, 2016", w/o English Translation, 15 pgs.
"Mexican Application Serial No. MX/a/2014/011092, Response filed Jul. 11, 2016 to Office Action dated Feb. 26, 2016", w/o English Translation, 23 pgs.
Alcatel-Lucent, et al., "Priority and Label/QCI characteristics", 3GPP Draft, (Nov. 16, 2007), 7 pgs.
Hussain, Nasir, et al., "Dynamic Admission Control and Scheduling for Efficient Channel Utilization in LTE Networks", Science International, vol. 23, No. 3, (Sep. 30, 2011), 151 pgs.
"U.S. Appl. No. 13/600,675, Advisory Action dated Jan. 23, 2015", 5 pgs.
"U.S. Appl. No. 13/600,675, Final Office Action dated Sep. 18, 2015", 25 pgs.
"U.S. Appl. No. 13/600,675, Final Office Action dated Nov. 3, 2014", 29 pgs.
"U.S. Appl. No. 13/600,675, Non Final Office Action dated Apr. 6, 2015", 24 pgs.
"U.S. Appl. No. 13/600,675, Non Final Office Action dated May 9, 2014", 28 pgs.
"U.S. Appl. No. 13/600,675, Response filed Mar. 3, 2015 to Advisory Action dated Jan. 23, 2015", 12 pgs.
"U.S. Appl. No. 13/600,675, Response filed Sep. 9, 2014 to Non-Final Office Action dated May 9, 2014", 12 pgs.
"U.S. Appl. No. 13/600,675, Response filed Dec. 26, 2014 to Final Office Action dated Nov. 3, 2014", 12 pgs.
"U.S. Appl. No. 13/600,675, Response filed Aug. 6, 2015 to Non Final Office Action dated Apr. 6, 2015", 13 pgs.
Alcatel-Lucent, et al., "Priority and Label/QCI characteristics", 3GPP Draft; S2-075594_Priority And_Label V3, Mobile Competence Centre; 650, route des lucioles ; f-06921 Sophia-Antipolis Cedex; France, vol. SA WG2, No. Ljubljana; Nov. 16, 2007, XP050262251,, (Nov. 16, 2007).
"Canadian Application Serial No. 2,867,017, Office Action dated Oct. 17, 2017", 7 pgs.
"Chinese Application Serial No. 201380018734.6, Response filed Dec. 3, 2017 to Office Action dated Jul. 21, 2017", w/ English Claims, 14 pgs.
"European Application Serial No. 16197269.0, Communication Pursuant to Article 94(3) EPC dated Feb. 28, 2018", 4 pgs.
"European Application Serial No. 16197269.0, Response filed Sep. 22, 2017 to Extended European Search Report dated Jan. 23, 2017", 19 pgs.
"Malaysian Application Serial No. PI2014702607, Office Action dated Nov. 15, 2017", w/English Translation, 3 pgs.
"Malaysian Application Serial No. PI2014702607, Response filed Jan. 15, 2018 to Office Action dated Nov. 15, 2017", w/ English Translation, 6 pgs.
"Mexican Application Serial No. MX/a/2014/011092, Office Action dated Jul. 5, 2017", wi/English Translation, 15 pgs.
"Mexican Application Serial No. MX/a/2014/011092, Response filed Nov. 21, 2017 to Office Action dated Jul. 5, 2017", w/English Claims, 13 pgs.
"Russian Application Serial No. 2016136202, Office Action dated Jul. 13, 2017", w/English Translation, 9 pgs.
"Russian Application Serial No. 2016136202, Response filed Oct. 13, 2017 to Office Action dated Jul. 13, 2017", w/English Claims, 9 pgs.
"Canadian Application Serial No. 2,867,017, Resposne filed Apr. 17, 2018 to Office Action dated Oct. 17, 2017", 19 pgs.
"European Application Serial No. 16197269.0, Response filed Jul. 10, 2018 to Communication Pursuant to Article 94(3) EPC dated Feb. 28, 2018", 11 pgs.
"Canadian Application Serial No. 2,867,017, Examiner's Rule 30(2) Requisition mailed Sep. 19, 2018", 6 pgs.
"Canadian Application Serial No. 2,867,017, Response filed Mar. 7, 2019 to Examiner's Rule 30(2) Requisition mailed Sep. 19, 2018", 15 pgs.

\* cited by examiner

| QCI | RESOURCE TYPE | PRIORITY | PACKET DELAY BUDGET (MS) | PACKET ERROR LOSS RATE | EXAMPLE SERVICES |
|---|---|---|---|---|---|
| 1 | GBR | 2 | 100 | $10^{-2}$ | CONVERSATIONAL VOICE |
| 2 | GBR | 4 | 150 | $10^{-3}$ | CONVERSATIONAL VIDEO (LIVE STREAMING) |
| 3 | GBR | 5 | 300 | $10^{-4}$ | NON-CONVERSATIONAL VIDEO (BUFFERED STREAMING) |
| 4 | GBR | 3 | 50 | $10^{-3}$ | REAL TIME GAMING |
| 5 | NON-GBR | 1 | 100 | $10^{-4}$ | IMS SIGNALING |
| 6 | NON-GBR | 7 | 100 | $10^{-3}$ | VOICE, VIDEO (LIVE STREAMING), INTERACTIVE GAMING |
| 7 | NON-GBR | 6 | 300 | $10^{-6}$ | VIDEO (BUFFERED STREAMING) |
| 8 | NON-GBR | 8 | 300 | $10^{-6}$ | TCP BASED (FOR EXAMPLE, WWW, E-MAIL), CHAT, FTP, P2P FILE SHARING, PROGRESSIVE VIDEO AND OTHERS |
| 9 | NON-GBR | 9 | 300 | $10^{-6}$ | DEFAULT BEARER |

Fig. 3A

EXAMPLE SUB-QCI CHARACTERISTICS

| QCI | SUB-QCI | PRIORITY | PACKET DELAY BUDGET | PACKET ERROR RATE | EXAMPLE APPS |
|---|---|---|---|---|---|
| 9 | 1 | 2 (LOW) | 300ms | $10^{-6}$ | OTT NON-REAL TIME APPS (E-MAIL, FTP) |
| 9 | 2 | 1 (HIGH) | 100ms | $10^{-2}$ | OTT REAL-TIME APPS (SKYPE, FACETIME, GOOGLE TALK) |

Fig. 3B

PACKET SIZE BASED INTRA-QCI CLASSIFICATION

| QCI | SUB-QCI | DESTINATION PORT (DOWNLINK FLOW) | PACKET SIZE |
|---|---|---|---|
| 9 | 1 | EQUAL TO 7558 | ≥200 BYTES |
| 9 | 2 | EQUAL TO 7558 | <200 |
| 9 | 3 OR 1 | NOT EQUAL TO 7558 | ANY |

INTRA-QCI SCHEDULER AND METHOD FOR INTRA-QCI SCHEDULING IN A WIRELESS ACCESS NETWORK

PRIORITY CLAIM

This application is a continuation of U.S. patent application Ser. No. 13/600,675, filed Aug. 31, 2012, which claims the benefit of priority under 35 U.S.C. 119(e) to U.S. Provisional Patent Application Ser. No. 61/612,188, filed Mar. 16, 2012, each of which is incorporated herein by reference in its entirety.

TECHNICAL FIELD

Embodiments pertain to wireless communications. Some embodiments relate to packet scheduling in wireless access networks including 3GPP Universal Terrestrial Radio Access Network (UTRAN) Long-Term-Evolution (LTE) networks (E-UTRAN). Some embodiments relate to the Evolved Packet Core (EPC) of an LTE network.

BACKGROUND

In some conventional packet-based wireless access networks, data flows may be associated with a particular quality-of-service (QoS) class or level QoS levels allow for different priority levels to be assigned to different applications, users, or data flows, or to guarantee a certain level of performance to a data flow. Packet scheduling is based on the particular QoS level of the data flow. With the proliferation of portable internet devices such as smartphones, tablets and notebook devices, packets of various applications are delivered over-the-top (OTT) using a default bearer. The applications are transparent to the EPC making it difficult to support QoS level requirements for these applications.

Thus, there are general needs for systems and methods that provide improved QoS support for applications and particularly for applications that are transparent in the EPC.

BRIEF DESCRIPTION OF THE DRAWINGS

FIG. 3A illustrates QoS class identifiers (QCIs), in accordance with some embodiments;

FIG. 3B illustrates an example of sub-QCI characteristics, in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
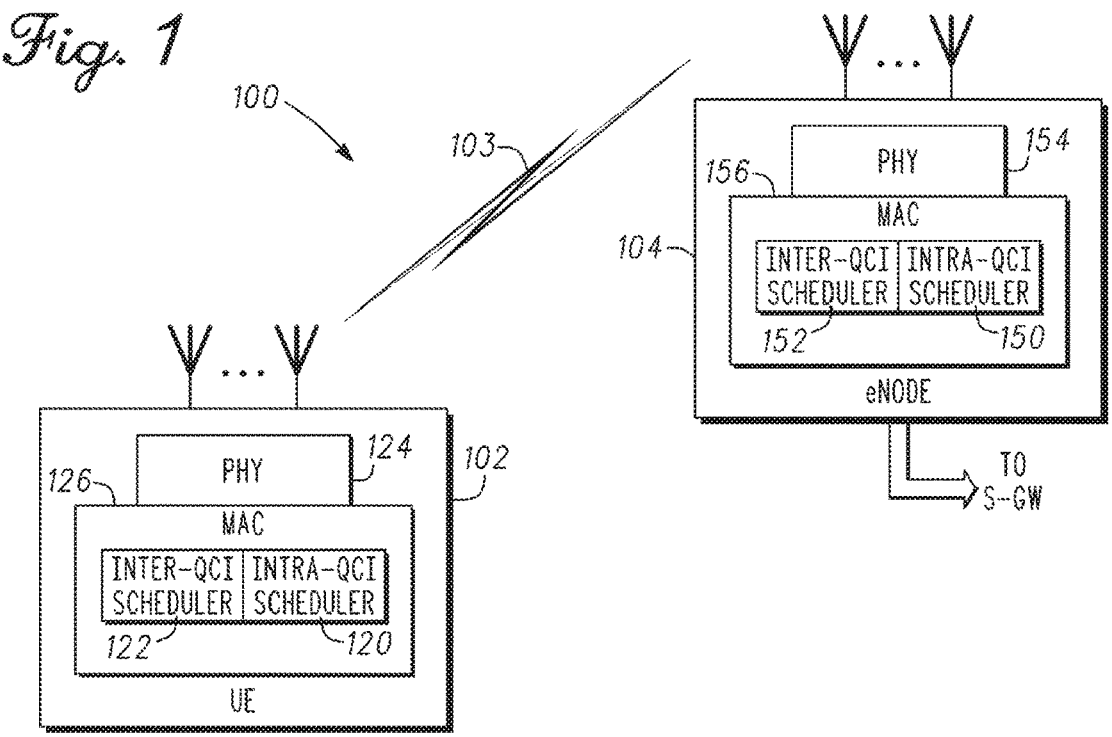
FIG. 1 illustrate elements of a wireless access network, in accordance with some embodiments.

FIG. 1 illustrates elements of a wireless access network, in accordance with some embodiments. Wireless access network 100 may include user equipment (UE) 102 and enhanced node B (eNodeB) 104, which communicate wirelessly over one or more wireless communication channels 103. In wireless access network 100, data flows may be mapped to bearers using QoS class identifiers (QCIs).

The eNodeB 104 may include a medium-access control (MAC) layer 156 that includes a MAC layer scheduler. The eNodeB 104 may also include physical (PHY) layer circuitry 154. The UE 102 may include MAC layer 126 that includes a MAC layer scheduler, as well as PHY layer circuitry 124.

In accordance with embodiments, the MAC layer scheduler of the eNodeB 104 may include an intra-QCI scheduler 150 to classify packets of one or more data flows having a same QCI and associated with a same UE 102 with a sub-QCI based on intra-QCI classification information received from the UE 102. In these embodiments, the sub-QCI may indicate a scheduling priority for packets of data flows having the same QCI. The intra-QCI scheduler 150 may schedule packets for downlink transmission over a radio bearer between the eNodeB 104 and the UE 102 based on the sub-QCI. These embodiments are described in more detail below.

In these embodiments, packets of different data flows that may have the same QCI may be assigned different sub-QCIs. Furthermore, packets of the same data flow (having the same QCI) may also be further classified with different sub-QCIs. In these embodiments, a packet of a data flow having a certain QCI that has been classified with a sub-QCI indicating higher scheduling priority may be scheduled before a packet of a data flow with the same QCI but having sub-QCI indicating lower scheduling priority. In these embodiments, performing intra-QCI scheduling may include the classification of packets with sub-QCIs based on intra-QCI classification information provided by the UE 102 and the scheduling of packets for downlink transmission based on the assigned sub-QCIs.

In these embodiments, since it is the UE 102 that is providing the intra-QCI classification information to the eNodeB 104, it is the UE 102 that can decide, for example, how packets of the different applications or data flows are prioritized at the eNodeB 104. Accordingly, UE-assisted intra-QCI downlink scheduling may be performed. These embodiments are described in more detail below. In other embodiments, eNodeB-assisted intra-QCI uplink scheduling may be performed. These embodiments are also described in more detail below.

In some embodiments, the data flows may be mapped to bearers using the QCIs to provide end-to-end QoS support via an evolved packet system (EPS) bearer. In some embodiments, the characteristics of QCIs may be in accordance with 3GPP Technical Specification (TS) 23.203, although this is not a requirement.

In accordance with embodiments, the MAC layer scheduler of the eNodeB 104 may also include an inter-QCI scheduler 152. The inter-QCI scheduler 152 may allocate bandwidth grants for scheduling packets for transmission over the radio bearer based on the QCI of the packet's data flow. After the allocation by the inter-QCI scheduler 152, the intra-QCI scheduler 150 may schedule packets of the QCI for which a grant was allocated for transmission over the radio bearer 203 based on the sub-QCI.

Accordingly, packets associated with data flows of the same QCI may be prioritized for downlink transmission based on their sub-QCI. In some embodiments, the intra- QCI scheduler 150 and the inter-QCI scheduler 152 may operate as part of a MAC layer scheduler, such as an LTE network scheduler. In these embodiments, each QoS class may be mapped to one of the QCIs (i.e., each data flow may be associated with a single QoS class) as illustrated in FIG. 3B.

In some embodiments, the PHY layer circuitry 154 may be configured to communicate wirelessly with the UE 102, including being configured to receive the intra-QCI classification information from the UE 102 as well as transmit the scheduled packets to the UE 102.

In these embodiments, wireless access network 100 may provide an all-IP core network with open interfaces and may be referred to as an EPC. The EPC may provide higher throughput, lower latency, simplified mobility between 3GPP and non-3GPP networks, enhanced service control and provisioning, and efficient use of network resources.

In some embodiments, the intra-QCI scheduler 150 may schedule packets based on the sub-QCI under predetermined network conditions and may refrain from using the sub-QCI when the predetermined network conditions do not exist. In these embodiments, the intra-QCI scheduler 150 may use the sub-QCI to schedule packets only under certain network conditions (e.g., conditions that may cause packet delay, such as congestion, interference and increased packet-error-rate (PER), channel unreliability, etc.), although the scope of the embodiments is not limiting in this respect. When those certain network conditions do not exist, the intra-QCI scheduler 150 (or the inter-QCI scheduler 152) may schedule packets for transmission based on the QCI. When those certain network conditions do not exist, the intra-QCI scheduler 150 may refrain from using sub-QCIs to schedule packets.

In some embodiments, the UE 102 and the eNodeB 104 may be configured to communicate in accordance with an orthogonal frequency division multiple access (OFDMA) technique. The OFDMA technique may be either a frequency domain duplexing (FDD) technique that uses different uplink and downlink spectrum or a time-domain duplexing (TDD) technique that uses the same spectrum for uplink and downlink.

Figure 2:
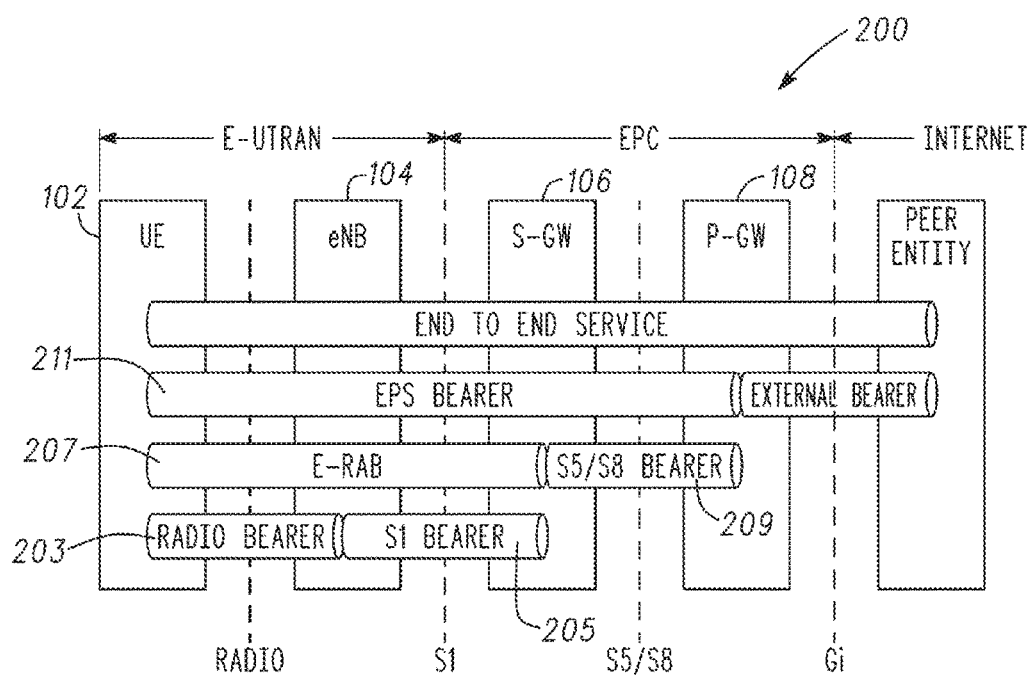
FIG. 2 illustrates various bearers, in accordance with some embodiments.

FIG. 2 illustrates various bearers, in accordance with some embodiments. In these embodiments, data flows are mapped to bearers 200 using QCIs. In accordance with embodiments, the intra-QCI scheduler 150 (FIG. 1) may schedule packets for downlink transmission over the radio bearer 203 (i.e., between the eNodeB 104 and the UE 102) based on the sub-QCI.

As illustrated in FIG. 2, an E-UTRAN radio-access bearer (E-RAB) 207 may transport the packets of an EPS bearer 211 between the UE 102 and the EPC. When an E-RAB 207 exists, there may be a one-to-one mapping between the E-RAB 207 and the EPS bearer 209. The data radio bearer 203 may transport the packets of an EPS bearer 211 between a UE 102 and an eNodeB 104. When a data radio bearer exists, there may be a one-to-one mapping between the data radio bearer and the EPS bearer or E-RAB. The S1 bearer 205 may transport the packets of an E-RAB 207 between an eNodeB 104 and a serving gateway (S-GW) 106. An S5/S8 bearer 209 may transport the packets of an EPS bearer 211 between the S-GW 106 and a packet data network (PDN) gateway (P-GW) 108.

The UE 102 may store a mapping between an uplink packet filter and a data radio bearer to create the binding between a data flow and a data radio bearer in the uplink. An uplink traffic-flow template (TFT) in the may bind a data flow to an EPS bearer in the uplink direction. Multiple data flows may be multiplexed onto the same EPS bearer. A downlink TFT in the PDN GW may bind a data flow to an EPS bearer in the downlink direction. Multiple data flows can be multiplexed onto the same EPS bearer by including multiple downlink packet filters in the downlink TFT. The P-GW 108 may store a mapping between a downlink packet filter and an S5/S8 bearer 209 to create the binding between a data flow and an S5/S8a bearer in the downlink.

The eNodeB 104 may store a one-to-one mapping between the data radio bearer 203 and the S1 bearer 205 to create the binding between a data radio bearer and an S1 bearer in both the uplink and downlink. The S-GW 106 may store a one-to-one mapping between the S1 bearer 205 and the S5/S8 bearer 209 to create the binding between an S1 bearer and an S5/S8 bearer in both the uplink and downlink.

FIG. 3A illustrates QCIs, in accordance with some embodiments. In these embodiments, data flows are mapped to bearers 200 (FIG. 2) using QCIs 302. For each QCI, a resource type (either guaranteed bit rate (GBR) or non-GBR), priority, packet delay budget, packet error loss rate and example services are illustrated.

In accordance with embodiments, the inter-QCI scheduler 152. (FIG. 1) is to allocate bandwidth grants for scheduling packets for transmission over the radio bearer 203 based on the QCI 302 of the packet's data flow. After the allocation by the inter-QCI scheduler 152, the intra-QCI scheduler 150 (FIG. 1) is to schedule packets for which a grant was allocated for transmission over the radio bearer 203 based on the sub-QCIs. Unlike the inter-QCI scheduler 152, the intra-QCI scheduler 152 may operate only on the radio bearer 203 (FIG. 2) rather than any other bearers. Therefore, no modifications or additional signal may be needed from the EPC.

In some embodiments, the intra-QCI classification information provided by the UE 102 includes the sub-QCIs associated with one or more of intra-flow classification information and inter-flow classification information. The inter-flow classification information may include one or more of IP header fields including source addresses, destination addresses, source ports, destination ports, and protocol types e.g., a user-datagram protocol (UDP) or a transmission control protocol (TCP)). The intra-flow classification information may include one or more of packet size or payload information. In these embodiments, the inter-flow classification information may be used for classifying packets of different flows having a same QCI. The intra-flow classification information may be used for classifying packets of the same data flow. These embodiments allow the LTE 102 to assign the appropriate sub-QCI based on the application. For example, the intra-QCI classification information may inform the eNodeB 104 that a downlink packet with an IP destination port=7558 and a packet size<200 B should be classified and scheduled using sub-QCI=2 (high priority), and all other packets should be classified and scheduled using sub-QCI=1.

In some embodiments, the UE 102 may provide the sub-QCIs and the inter-flow classification information to the eNodeB 104 when would like the eNodeB 104 to perform inter-flow classification. In some embodiments, the UE 102 may provide the sub-QCIs and the intra-flow classification information when would like the eNodeB 104 to perform intra-flow classification. In some embodiments, the UE 102 may provide the sub-QCIs and both the intra-flow classification information and the inter-flow classification information to the eNodeB 104 when would like the eNodeB 104 to perform both inter-flow classification and intra-flow classification. In some embodiments, the intra-flow classification bits may be used to indicate whether the packet is an audio, a video, a video and audio, or an unknown packet type.

In some embodiments, the intra-QCI scheduler 150 may classify packets of different data flows having the same QCI using the intra-QCI classification information. Packets of a first data flow are classified with a first sub-QCI (i.e., sub-QCI=1), and packets of a second data flow are classified with a second sub-QCI (i.e., sub-QCI=2). When the first data flow has QoS related parameters including one of a greater packet delay budget and a greater packet error loss rate than the QoS related parameters of the second data flow, the first sub-QCI has a lower priority than the second sub-QC. Accordingly, through the use of different sub-QCIs, packets of different data flows that have the same QCI may be treated differently, for example, when there is network congestion. In these embodiments, different data flows having the same QCI may be assigned different sub-QCIs.

FIG. 3B illustrates an example of sub-QCI characteristics, in accordance with some embodiments. In this example, two sub-QCIs (sub-QCI=1 and sub-QCI=2) may be used for a default bearer (QCI=9). In some embodiments, the default bearer may be used for non-privileged subscribers. Subscribers with privileges (including premium subscribers) may be able to utilize higher priority QCIs (i.e., QCIs 1 through 8). For data flows of the default bearer having a predetermined QCI (QCI=9), the intra-QCI scheduler 150 (FIG. 1) may classify packets of data flows having the predetermined QCI and associated with at least some non-real-time applications with the first sub-QCI (i.e., sub-QCI=1), and may classify packets of data flows having the predetermined QCI and associated with at least some real-time applications with the second sub-QCI (i.e., sub-QCI=2). The intra-QCI scheduler 150 may give scheduling priority to packets classified with the second sub-QCI over packets classified with the first sub-QCI.

In these embodiments, the first sub-QCI may have at least one of a lower priority, a greater packet delay budget, and a greater packet error loss rate than the second sub-QCI. An example of this flow-based classification using sub-QCIs is illustrated in the table of FIG. 3B. In some embodiments, the intra-QCI scheduler 150 is to give scheduling priority to packets classified with the second sub-QCI over packets classified with the first sub-QCI only when certain network conditions exist, such as network congestion, although the scope of the embodiments is not limited in this respect.

In some embodiments, packets of the data flows are delivered OTT using the default bearer. In these embodiments, the intra-QCI classification information provided by the UE 102 may indicate to the intra-QCI scheduler 150 how to classify different data flows of the default bearer with the sub-QCI. These embodiments provide QoS support for data flows of applications that have been mapped to a default bearer (e.g., QCI=9). Examples of such applications include applications that may be running on a portable internet device such as a smartphone, tablet or ultrabook for use over the network. Data packets generated by these applications may be delivered OTT (i.e., using the default bearer since the QoS requirements may not be known to the network or the mobile operators (e.g., sometimes due to encryption). Embodiments allow real-time applications, such as Skype, FaceTime, GoogleTalk and voice-over-internet protocol (VoIP) with different QoS requirements in terms of delay and throughput, to be distinguished from non-real-time applications such as web browsing or email.

In some embodiments, the eNodeB 104 may perform intra-flow sub-classification. In these embodiments, the eNodeB may classify packets of a same data flow with different sub-QCIs based on the intra-QCI classification information. In these embodiments, the intra-QCI classification information may include one or more packet characteristics (i.e., for intra-flow classification) including packet size or other payload information.

Figures 3C, 4:
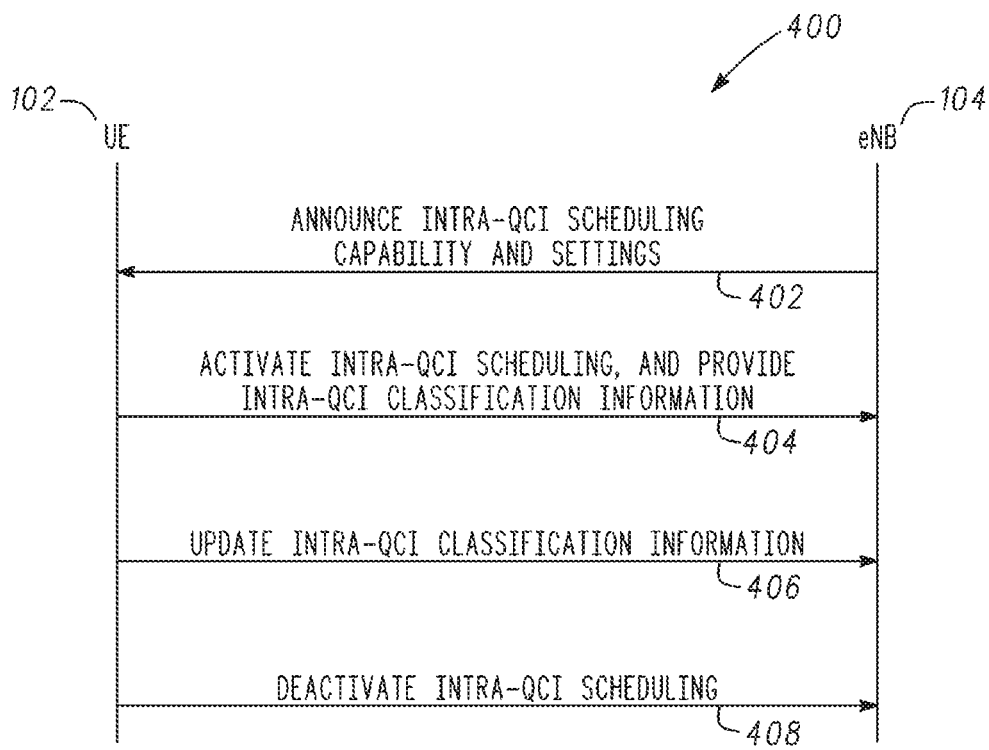
FIG. 3C illustrates packet size based intra-QCI classification, in accordance with some embodiments.
FIG. 4 illustrates an intra-QCI scheduling protocol, in accordance with some embodiments.

In these embodiments, for a same data flow of the default bearer having the predetermined QCI [(i.e., QCI=9)], the intra-QCI scheduler 150 may classify packets associated with a predetermined destination port (e.g., destination port 7558) based at least in part on packet size. The intra-QCI classification information provided by the UE 102 may indicate to the intra-QCI scheduler 150 to classify packets associated with the predetermined destination port based at least in part on certain packet size. An example of this is illustrated in the table of FIG. 3C. In these embodiments, packets of the same data flow may have the same destination port. In this example, packets associated with the indicated destination port having a size greater than or equal to a predetermined packet size (e.g., 200 bytes) may be classified with a first sub-QCI (i.e., sub-QCI=1), and packets associated with the indicated destination port having a size less than the predetermined packet size (e.g., 200 bytes) are classified with a second sub-QCI (i.e., sub-QCI=2). In these embodiments, the first and second sub-QCIs may be associated with one or more of a different priority, packet delay budget and packet error loss rate. The use of these intra-flow classification parameters (e.g., packet size) allows packets of the same data flow to be scheduled differently. In the example illustrated in FIG. 3C, smaller packets with the sub-QCI=1 may be given a lower scheduling priority than the larger packets with the sub-QCI=2, although the scope of the embodiments is not limited in this respect.

In these embodiments, packets associated with a destination port other than the indicated destination port (i.e., a different data flow) may be classified with a predetermined one of either the first or the second sub-QCI, or a third sub-QCI (as illustrated in FIG. 3C). In these embodiments, packets of certain data flows may be classified based on intra-flow characteristics using sub-QCIs, while all packets of a different data flow may be classified with the sub-QCI regardless of any intra-flow characteristics such as packet size.

FIG. 4 illustrates an intra-QCI scheduling protocol 400, in accordance with some embodiments. In these embodiments, the eNodeB 104 (FIG. 1) may send a message 402 to the UE 102 (FIG. 1) to indicate support of UE-assisted intra-QCI downlink scheduling. The message may indicate the sub-QCIs (e.g., sub-classes) supported for at least one or more QCIs, The eNodeB 104 may receive a message 404 from the UE 102 in response to message 402 indicating that the LIE 102 has activated intra-QCI scheduling. The message 404 may include the intra-QCI classification information. The eNodeB 104 may perform intra-QCI scheduling in response to message 404 for transmission of downlink packets to the UE 102 based on the intra-QCI classification information provided by the UE 102.

In some embodiments, message 402 may be sent to the UE 102 on a physical downlink control channel (PDCCH), message 404 may be received from the UE 102 on a physical uplink control channel (PUCCH), and the scheduled downlink packets may be sent to the UE 102 on a physical downlink shared channel (PDSCH), in accordance with one of the 3GPP LTE standards.

In some embodiments, message 402 may also indicate the number of sub-classes (sub-QCIs) that are supported for each QCI. Each subclass may be uniquely identified by a scalar (i.e., the sub-QCI. In one example embodiment, the eNodeB 104 may support two subclasses under a default bearer (QCI=9), and each sub-class may be pre-configured with various QoS characteristics. In another example embodiment, the eNodeB 104 may support two sub-classes for QCI=9, three subclasses for QCI=8, four subclasses for QCI=7, and so forth. In these example embodiments, up to N subclasses may be supported for any one or more QCIs (e.g., QCI=1 to QCI=9) where N may range from two to 10 or more.

In some embodiments, a message may be received from the LIE 102 in response to message 402 that the UE 102 does not support LIE-assisted intra-QCI scheduling or that the UE 102 is not activating LIE-assisted intra-QCI scheduling. In these embodiments, the eNodeB 104 may refrain from performing LIE-assisted intra-QCI scheduling.

In some embodiments, the UE 102 may provide updated intra-QCI classification information by sending message 406 to the eNodeB 104. For example, message 406 may be sent when the UE 102 is running additional applications over the default bearer. The UE 102 may also send message 408 to the eNodeB 104 when it wishes to deactivate UE-assisted intra-QCI scheduling.

In some embodiments, an intra-QCI scheduler 120 (FIG. 1) of the UE 102 may classify packets of data flows having a same QCI with a sub-QCI based intra-QCI classification information, The intra-QCI scheduler 120 may schedule packets for uplink transmission over a radio bearer 203 based on the sub-QCI. In these embodiments, an intra-QCI scheduler 120 may determine the intra-QCI classification information for classifying packets with sub-QCIs based on one or more data flow parameters or one or more packet characteristics. Accordingly, the UE 102 may also perform intra-QCI scheduling for uplink packets; however, no additional messaging between the UE 102 and the eNodeB 104 is needed for this purpose since it can be done by the UE 102 itself without involvement of or knowledge by the eNodeB 104. In accordance with some embodiments, LIE 102 may include an inter-QCI scheduler 122 (FIG. 1). The inter-QCI scheduler 122 may allocate bandwidth grants for scheduling packets for transmission over the radio bearer 203 (FIG. 2) based on the QCI of the packet's data flow.

In some embodiments, a MAC layer scheduler for an eNodeB, such as eNodeB 104, is provided. In these embodiments, the MAC layer scheduler may be configured to classify packets of one or more data flows mapped to a default bearer with a sub-class based on sub-class classification information received from the UE. The sub-class may indicate a scheduling priority for packets of the data flows of the default bearer. The MAC layer scheduler may allocate bandwidth grants for scheduling packets for transmission over the radio bearer based on the QCI of the packet's data flow, and may schedule packets for which a grant was allocated for transmission for downlink transmission over a radio bearer based on the sub-class.

In some embodiments, the role of the LE 102 and the eNodeB 104 may be reversed in FIG. 4 for eNodeB-assisted intra-QCI uplink scheduling. In these embodiments, the UE 102 (FIG. 1) may send a message 402 to the eNodeB 104 to indicate support of eNodeB-assisted intra-QCI uplink scheduling. The message may indicate the sub-QCI is (e.g., sub-classes) supported for at least one or more QCIs. The UE 102 may receive a message 404 from the eNodeB 104 in response to message 402 indicating that the eNodeB 104 has activated intra-QCI scheduling. The message 404 may include the intra-QCI classification information. The UE 102 may perform intra-QCI scheduling in response to message 404 for transmission of uplink packets to the eNodeB 104 based on the intra-QCI classification information provided by the eNodeB 104.

In some embodiments, the UE 102 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

The UE 102 and the eNodeB 104 may include one or more antennas. The antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station.

In some embodiments, the UE 102 may include one or more of a keyboard, a display, a non-volatile memory port, multiple antennas, a graphics processor, an application processor, speakers, and other mobile device elements. The display may be a liquid crystal display (LCD) screen including a touch screen.

Although the UE 102 and the eNodeB 104 are illustrated in FIG. 1 as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

The Abstract is provided to comply with 37 CFR. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an evolved Node B (eNodeB), the apparatus comprising:
   memory; and
   processing circuitry configured to:
   during congestion situations, schedule a packet for downlink transmission to a user equipment based first on a quality-of-service (QoS) class identifier (QCI) and secondly based on a sub-QCI, the sub-QCI indicating a scheduling priority for packets with a same QCI during congestion situations;
   during non-congestion situations, schedule the packet for downlink transmission to the user equipment based on the QCI without considering the sub-QCI; and
   configure the eNodeB to transmit the scheduled packet over a radio bearer to the user equipment.

2. The apparatus of claim 1, wherein
   the QCI and the sub-QCI are from an evolved packet core (EPC) entity.

3. The apparatus of claim 2, wherein the EPC entity is a packet data network gateway (PGW).

4. The apparatus of claim 2, wherein the sub-QCI is determined based on at least one of the following group: a category of data of the packet, an application sending the data of the packet, a subscription level of a subscriber of the user equipment, and a destination or sender Internet Protocol address of the packet.

5. The apparatus of claim 1, wherein the sub-QCI indicates a priority.

6. The apparatus of claim 1, wherein if the packet is associated with a real-time application, the sub-QCI is a first priority, and if the packet is associated with a non-real-time application, the sub-QCI is a second priority, and wherein the first priority indicates a higher priority than the second priority.

7. The apparatus of claim 1, wherein the eNodeB is configured to operate in a 3rd Generation Partnership Project (3GPP) Universal Terrestrial Radio Access Network (UTRAN) Long-Term-Evolution (LTE) network (E-UTRAN).

8. The apparatus of claim 1, wherein during congestion conditions, the packet is to be scheduled before other packets with a same value of a corresponding QCI as the QCI of the packet and a corresponding sub-QCI that indicates a lower priority than a priority indicated by the sub-QCI of the packet.

9. The apparatus of claim 1, further comprising transceiver circuitry coupled to the memory.

10. The apparatus of claim 9, further comprising one or more antennas couple to the transceiver circuitry.

11. An apparatus of an evolved Node B (eNodeB), the apparatus comprising:
    memory; and
    processing circuitry configured to:
    determine a schedule for a packet for downlink transmission to a user equipment based on a quality-of-service (QoS) class identifier (QCI) and a sub-QCI if there is congestion, and determine the schedule for the packet for downlink transmission to the user equipment based on the QCI if there is not congestion, the sub-QCI indicating a scheduling priority for packets with a same QCI during congestion situations; and
    configure the eNodeB to transmit the packet over a corresponding radio bearer of the QCI to the user equipment in accordance with the schedule.

12. The apparatus of claim 11, wherein the sub-QCI indicates a priority.

13. The apparatus of claim 11, further comprising transceiver circuitry coupled to the memory; and, one or more antennas couple to the transceiver circuitry.

14. A non-transitory computer-readable storage medium that stores instructions for execution by one or more processors of an apparatus of an evolved Node B (eNodeB), the instructions to configure the apparatus to perform operations to:
    during congestion situations, schedule a packet for downlink transmission to a user equipment based first on a quality-of-service (QoS) class identifier (QCI) and secondly based on a sub-QCI, the sub-QCI indicating a scheduling priority for packets with a same QCI during congestion situations;
    during non-congestion situations, schedule the packet for downlink transmission to the user equipment based on the QCI; and
    configure the eNodeB to transmit the scheduled packet over a radio bearer to the user equipment.

15. The non-transitory computer-readable storage medium of claim 14, wherein
    the QCI and the sub-QCI are from an evolved packet core (EPC) entity.

16. The non-transitory computer-readable storage medium of claim 15, wherein the EPC entity is a packet data network gateway (PGW).

17. The non-transitory computer-readable storage medium of claim 14, wherein the sub-QCI is determined based on at least one of the following group: a category of data of the packet, an application sending the data of the packet, a subscription level of a subscriber of the user equipment, and a destination or sender Internet Protocol address of the packet.

18. The non-transitory computer-readable storage medium of claim 14, wherein the eNodeB is configured to operate in a 3rd Generation Partnership Project (3GPP) Universal Terrestrial Radio Access Network (UTRAN) Long-Term-Evolution (LTE) network (E-UTRAN).

19. The non-transitory computer-readable storage medium of claim 14, wherein a higher value for the sub-QCI indicates a higher priority than a lower value for the sub-QCI.

20. The non-transitory computer-readable storage medium of claim 14, wherein the sub-QCI indicates a priority.

21. The apparatus of claim 1, wherein the packet further comprises a priority associated with the QCI.

* * * * *